(12) United States Patent
Obonai

(10) Patent No.: US 11,239,514 B2
(45) Date of Patent: Feb. 1, 2022

(54) LITHIUM ION BATTERY

(71) Applicant: Envision AESC Energy Devices Ltd., Sagamihara (JP)

(72) Inventor: Fumiaki Obonai, Sagamihara (JP)

(73) Assignee: Envision AESC Japan Ltd., Zama (JP)

( * ) Notice: Subject to any disclaimer, the term of this patent is extended or adjusted under 35 U.S.C. 154(b) by 195 days.

(21) Appl. No.: 16/491,716

(22) PCT Filed: Jan. 24, 2018

(86) PCT No.: PCT/JP2018/002135
§ 371 (c)(1),
(2) Date: Sep. 6, 2019

(87) PCT Pub. No.: WO2018/163636
PCT Pub. Date: Sep. 13, 2018

(65) Prior Publication Data
US 2021/0135198 A1 May 6, 2021

(30) Foreign Application Priority Data

Mar. 10, 2017 (JP) .............................. JP2017-046010

(51) Int. Cl.
*H01M 50/105* (2021.01)
*H01M 10/0525* (2010.01)
(Continued)

(52) U.S. Cl.
CPC ..... *H01M 50/105* (2021.01); *H01M 10/0525* (2013.01); *H01M 50/10* (2021.01); *H01M 50/172* (2021.01)

(58) Field of Classification Search
None
See application file for complete search history.

(56) References Cited

U.S. PATENT DOCUMENTS

2004/0096735 A1* 5/2004 Komatsu ............. H01M 50/557
429/176
2006/0210872 A1 9/2006 Yageta et al.
2015/0325822 A1 11/2015 Ichikawa et al.

FOREIGN PATENT DOCUMENTS

JP 2000-277066 A 10/2000
JP 2005-332726 A 12/2005
(Continued)

OTHER PUBLICATIONS

International Search Report for PCT/JP2018/002135 dated Apr. 10, 2018 [PCT/ISA/210].

*Primary Examiner* — Eli S Mekhlin
(74) *Attorney, Agent, or Firm* — Sughrue Mion, PLLC

(57) ABSTRACT

A lithium ion battery (100) of the invention includes a battery main body (10) which includes one or more power generation elements configured by laminating a positive electrode layer, an electrolyte layer, and a negative electrode layer, in this order; an outer package (20) which includes at least a heat-fusion resin layer (21) and a barrier layer (23), and in which the battery main body (10) is sealed; and a pair of electrode terminals (30), each of which is electrically connected to the battery main body (10) and at least a part of which is exposed to the outside of the outer package (20). The outer package (20) includes an accommodation portion (25) which accommodates the battery main body (10), a joint portion (27) where the heat-fusion resin layers (21) positioned on a peripheral portion of the accommodation portion (25) are joined with each other directly or through the electrode terminal (30), and an extruded resin portion (29) which is formed by extrusion of a part of the heat-fusion resin layer (21) of the joint portion (27) from the joint portion (27) to the accommodation portion (25) side, and a difference (Lmax−Lmin) between a maximum length Lmax and a minimum length Lmin of the extruded resin portion (Continued)

(29) is equal to or greater than 0.0 mm and equal to or smaller than 1.0 mm.

6 Claims, 4 Drawing Sheets

(51) Int. Cl.
 *H01M 50/172* (2021.01)
 *H01M 50/10* (2021.01)

(56) References Cited

FOREIGN PATENT DOCUMENTS

| | | |
|---|---|---|
| JP | 2011-216205 A | 10/2011 |
| JP | 2012-003919 A | 1/2012 |
| JP | 2014-232592 A | 12/2014 |
| WO | 2005/091398 A1 | 9/2005 |
| WO | 2013/191125 A1 | 12/2013 |

\* cited by examiner

LITHIUM ION BATTERY

CROSS REFERENCE TO RELATED APPLICATIONS

This application is a National Stage of International Application No. PCT/JP2018/002135 filed Jan. 24, 2018, claiming priority based on Japanese Patent Application No. 2017-046010 filed Mar. 10, 2017, and the disclosure of which is incorporated herein in its entirety.

TECHNICAL FIELD

The present invention relates to a lithium ion battery.

BACKGROUND ART

Laminated type lithium ion batteries are used as power sources of electronic devices such as note type personal computers or mobile phones, power sources of vehicles such as hybrid cars or electric cars, and the like, for example.

The Laminated type lithium ion battery has a structure in which a power generation element configured of a positive electrode, an electrolyte, and a negative electrode is sealed with a laminate film.

Technologies regarding the laminated type lithium ion battery are disclosed in Patent Document 1 (Japanese Unexamined Patent Publication No. 2005-332726), Patent Document 2 (Japanese Unexamined Patent Publication No. 2012-3919), and Patent Document 3 (Japanese Unexamined Patent Publication No. 2000-277066), for example.

Patent Document 1 discloses a laminated type lithium ion battery including a power generation element, and a laminate film covering the power generation element, in which the power generation element is covered with the laminate film from a front surface to the rear surface, and the power generation element is sealed by sealing an edge of the laminate film. Patent Document 1 discloses that the laminate film includes an accommodation portion which accommodates the power generation element and a flange portion positioned on the edge of the accommodation portion, the edge of the flange portion is sealed to form a sealed portion, and a non-sealed portion not subjected to the sealing is provided between the sealed portion and the accommodation portion.

Patent Document 1 discloses that the laminated type lithium ion battery having such a structure can improve a peeling strength of a heat sealing portion and certainly recover gas generated in the battery.

Patent Document 2 discloses a laminated type lithium ion battery including power generation elements each including a sheet-shaped positive electrode and a sheet-shaped negative electrode, and a laminate film in which the power generation elements are laminated, in which the laminate film includes a first sealing portion, a second sealing portion which has a welding strength weaker than a welding strength of the first sealing portion, and a resin gathering portion which is provided to be adjacent to the edge of the second sealing portion on the power generation element side and includes a cavity.

Patent Document 2 discloses that, in the laminated type lithium ion battery having such a structure, in a case where a pressure in the laminate film increases, the pressure is applied to the resin gathering portion, interfacial peeling occurs from the resin gathering portion, and as a result, the second sealing portion is cleaved with a pressure lower than the pressure, with which the first sealing portion is cleaved, and accordingly, it is possible to improve safety of the laminated type lithium ion battery.

Patent Document 3 discloses a non-aqueous electrolyte secondary battery, in which a power generation element including a positive electrode plate, a separator, and a negative electrode plate is accommodated in a bag-shaped single battery case, and a resin lump is provided on an inner side end portion of the bag-shaped single battery case welding portion.

Patent Document 3 discloses that, by providing the resin lump in the battery of the metal laminate resin film case, it is possible to disperse a stress applied to the welding portion, even in a state where a battery internal pressure increases, and it is possible to obtain a battery having excellent pressure resistance, without peeling of the metal laminate resin film case welding portion.

RELATED DOCUMENT

Patent Document

[Patent Document 1] Japanese Unexamined Patent Publication No. 2005-332726
[Patent Document 2] Japanese Unexamined Patent Publication No. 2012-3919
[Patent Document 3] Japanese Unexamined Patent Publication No. 2000-277066

SUMMARY OF THE INVENTION

Technical Problem

According to the studies of the inventors, it is clear that an insulation resistance of a laminated type lithium ion battery of the related art may decrease.

The invention is made in view of such circumstances, and an object of the invention is to provide a lithium ion battery having excellent insulating properties.

Solution to Problem

The inventors have conducted intensive studies for realizing a lithium ion battery having excellent insulating properties. As a result, the inventors have found that, in a case where a length of an extruded resin portion formed by extrusion of a part of a heat-fusion resin layer configuring an outer package from a joint portion has a variation, a stress is concentrated on a portion of the extruded resin portion having a long length, and insulation breakdown easily occurs.

The inventors have further conducted intensive studies based on the above finding, and have found that, by controlling a difference (Lmax−Lmin) between a maximum length Lmax and a minimum length Lmin of the extruded resin portion to be in a specific range, it is possible to stably obtain a lithium ion battery having excellent insulating properties.

The invention has been proposed based on such knowledge.

That is, according to the invention, a lithium ion battery shown below is provided.

According to the invention, there is provided a lithium ion battery, including: a battery main body which includes one or more power generation elements configured by laminating a positive electrode layer, an electrolyte layer, and a negative electrode layer, in this order; an outer package which includes at least a heat-fusion resin layer and a barrier layer, and in which the battery main body is sealed; and a pair of electrode terminals, each of which is electrically connected to the battery main body and at least a part of which is exposed to the outside of the outer package, in which the outer package includes an accommodation portion which accommodates the battery main body, a joint portion where the heat-fusion resin layers positioned on a peripheral portion of the accommodation portion are joined with each other directly or through the electrode terminal, and an extruded resin portion which is formed by extrusion of a part of the heat-fusion resin layer of the joint portion from the joint portion to the accommodation portion side, and a difference (Lmax−Lmin) between a maximum length Lmax and a minimum length Lmin of the extruded resin portion measured under the following condition is equal to or greater than 0.0 mm and equal to or smaller than 1.0 mm.

<Condition>

Lengths L of the extruded resin portion are measured regarding 10 points in total in a region including a center portion of one side of the lithium ion battery on a side where the electrode terminals are not exposed, and the maximum length is set as the maximum length Lmax and the minimum length is set as the minimum length Lmin, from the obtained 10 lengths. Here, the length L of the extruded resin portion is a length from an end portion of the joint portion on the accommodation portion side to an end portion of the extruded resin portion on the accommodation portion side and is a length in a vertical direction with respect to the one side.

Advantageous Effects of Invention

According to the invention, it is possible to provide a lithium ion battery having excellent insulating properties.

BRIEF DESCRIPTION OF THE DRAWINGS

The abovementioned object and other objects, characteristics, and advantages become further clear with reference to suitable embodiments which will be described later and the following accompanying drawings.

DESCRIPTION OF EMBODIMENTS

Figure 1:
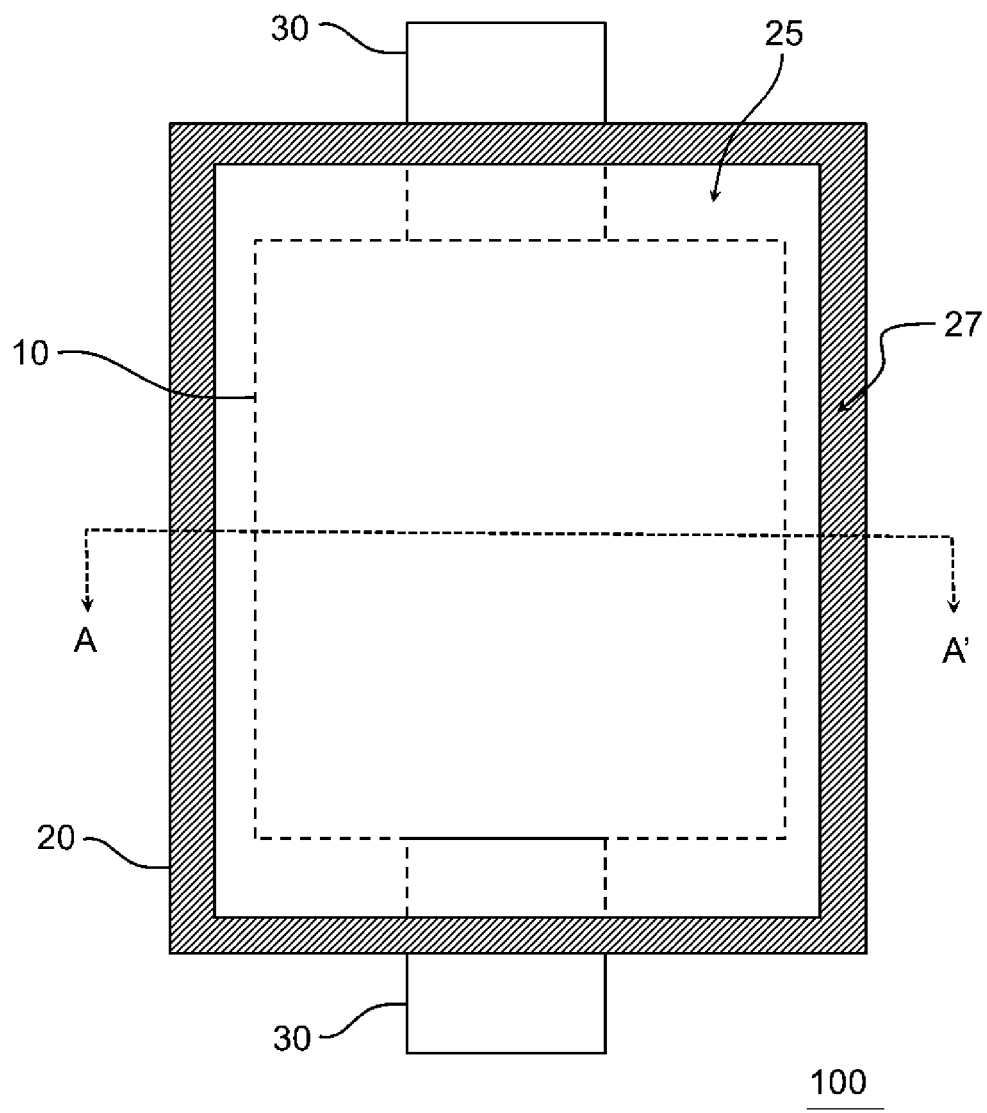
FIG. 1 is a plan view schematically showing an example of a structure of a lithium ion battery of an embodiment according to the invention.

Hereinafter, the embodiment of the invention will be described with reference to the drawings. In all drawings, the same reference numerals are used for the same constituent elements and the suitable description is not repeated. In the drawings, regarding each constituent element, a shape, a size, and a disposition relationship are schematically shown to a degree that the invention can be understood, and those may be different from the actual size. In addition, a term "to" in a case of describing the range of numerical values means equal to or greater than a value and equal to or smaller than a value, unless otherwise noted.

Figure 2:
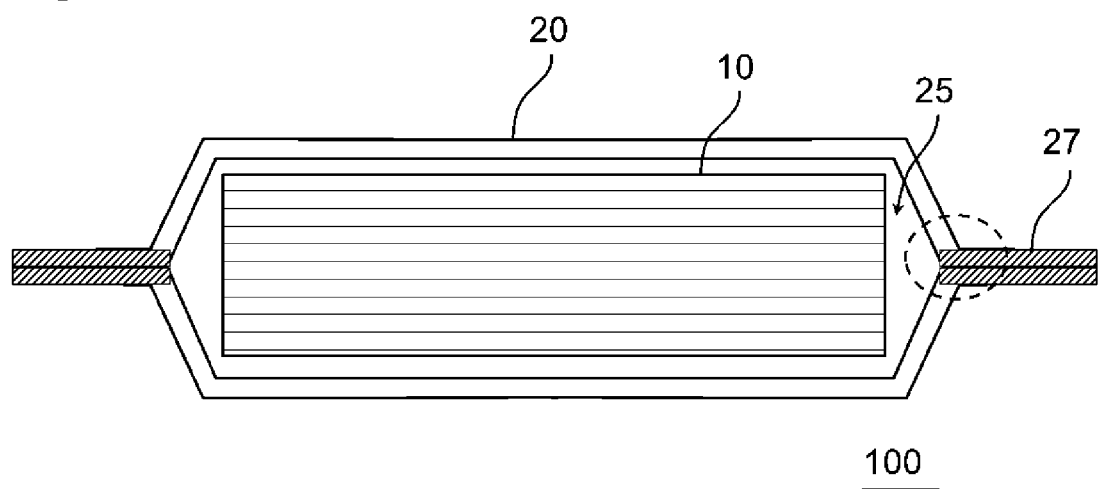
FIG. 2 is a cross-sectional view schematically showing an example of a structure of a lithium ion battery according to the embodiment and is a cross-sectional view in A-A-' direction shown in FIG. 1.
Figure 3:
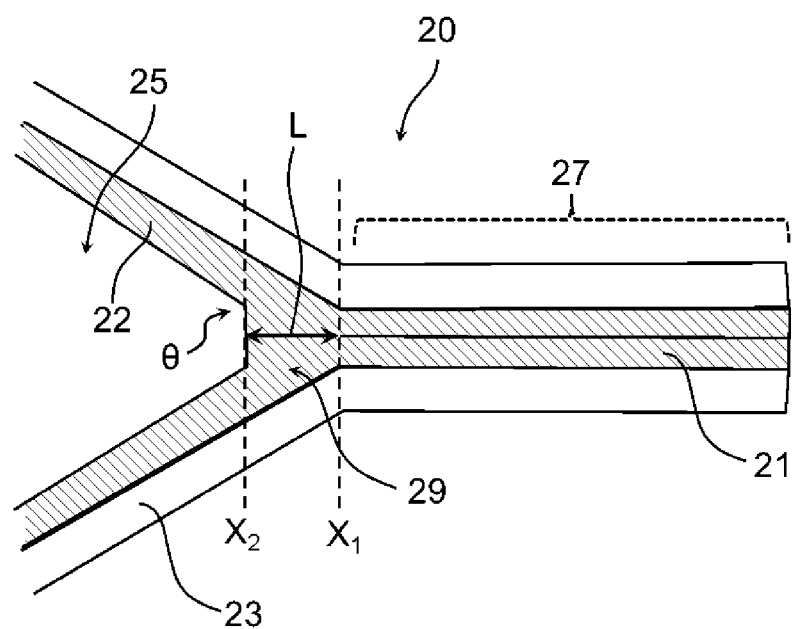
FIG. 3 is an enlarged view of a dotted line portion shown in FIG. 2.

FIG. 1 is a plan view schematically showing an example of a structure of a lithium ion battery 100 of an embodiment according to the invention. FIG. 2 is a cross-sectional view schematically showing an example of a structure of a lithium ion battery 100 according to the embodiment and is a cross-sectional view in A-A-' direction shown in FIG. 1. FIG. 3 is an enlarged view of a dotted line portion shown in FIG. 2.

As shown in FIGS. 1 to 3, the lithium ion battery 100 according to the embodiment includes a battery main body 10 which includes one or more power generation elements configured by laminating a positive electrode layer, an electrolyte layer, and a negative electrode layer, in this order, an outer package 20 which includes at least a heat-fusion resin layer 21 and a barrier layer 23, and in which the battery main body 10 is sealed; and a pair of electrode terminals 30, each of which is electrically connected to the battery main body 10 and at least a part of which is exposed to the outside of the outer package 20. The outer package 20 includes an accommodation portion 25 which accommodates the battery main body 10, a joint portion 27 where the heat-fusion resin layers 21 positioned on a peripheral portion of the accommodation portion 25 are joined with each other directly or through the electrode terminal 30, and an extruded resin portion 29 which is formed by extrusion of a part of the heat-fusion resin layer 21 of the joint portion 27 from the joint portion 27 to the accommodation portion 25 side, and a difference (Lmax−Lmin) between a maximum length Lmax and a minimum length Lmin of the extruded resin portion 29 measured under the following condition is equal to or greater than 0.0 mm and equal to or smaller than 1.0 mm.

<Condition>

Lengths L of the extruded resin portion 29 are measured regarding 10 points in total in a region including a center portion of one side of the lithium ion battery 100 on a side where the electrode terminals 30 are not exposed, and the maximum length is set as the maximum length Lmax and the minimum length is set as the minimum length Lmin, from the obtained 10 lengths. Here, the length L of the extruded resin portion 29 is a length from an end portion $X_1$ of the joint portion 27 on the accommodation portion 25 side to an end portion $X_2$ of the extruded resin portion 29 on the accommodation portion 25 side and is a length in a vertical direction with respect to the one side.

The inventors have conducted intensive studies for realizing the lithium ion battery 100 having excellent insulating properties. As a result, the inventors have found that, in a case where the lengths L of the extruded resin portion 29 formed by extrusion of a part of the heat-fusion resin layer 21 from the joint portion 27 has a variation, a stress is concentrated on a portion of the extruded resin portion 29 having a long length, and insulation breakdown easily occurs. The inventors have further conducted intensive studies based on the above finding, and have firstly found that, by controlling a difference (Lmax−Lmin) between the maximum length Lmax and the minimum length Lmin of the extruded resin portion 29 to be in the range described above, it is possible to stably obtain the lithium ion battery 100 having excellent insulating properties.

That is, according to the embodiment, by setting the difference (Lmax−Lmin) between the maximum length Lmax and the minimum length Lmin of the extruded resin portion 29 to be in the range described above, it is possible to increase the insulation resistance and stably obtain the lithium ion battery 100 having excellent insulating properties.

In addition, the lithium ion battery 100 according to the embodiment has excellent insulating properties between the outer package 20 and an electrolytic solution in the battery, and accordingly, reinforcement of an insulating material such as an insulating tape on the barrier layer 23 exposed to a side surface on the outer side of the outer package 20 can be omitted.

Further, in the lithium ion battery 100 according to the embodiment, in a case where various stresses such as repetition of load to the joint portion 27 due to vibration, bending of the joint portion 27, or a fluctuation in thickness of the battery due to charging and discharging, and stress to the joint portion 27 due to the fact that the accommodation portion 25 is set to be in a vacuum state, are applied, it is possible to prevent impregnation of the heat-fusion resin layer 21 with the electrolytic solution, and as a result, it is possible to prevent corrosion of the barrier layer 23 or interfacial peeling between the barrier layer 23 and the heat-fusion resin layer 21, and obtain long-term reliability of sealing properties of the outer package 20.

Here, a mark (mark of heating) due to the welding of the heat-fusion resin layers 21 may clearly appear on the surface of the laminated type lithium ion battery 100, in many cases, and normally, the position of the joint portion 27 can be visually determined. Accordingly, the end portion X1 of the joint portion 27 on the accommodation portion 25 side can be, for example, determined by the mark (mark of heating) due to the welding of the heat-fusion resin layers 21.

In addition, the length L of the extruded resin portion 29 can be measured using a microscope.

In addition, the difference (Lmax−Lmin) between the maximum length Lmax and the minimum length Lmin of the extruded resin portion 29, regarding all sides of the lithium ion battery 100 where the electrode terminals 30 are not exposed, is preferably equal to or greater than 0.0 mm and equal to or smaller than 1.0 mm, and the difference between the maximum length and the minimum length of the extruded resin portion 29 regarding all sides of the lithium ion battery 100, is more preferably equal to or greater than 0.0 mm and equal to or smaller than 1.0 mm.

Here, in order to set the difference (Lmax−Lmin) between the maximum length Lmax and the minimum length Lmin of the extruded resin portion 29 or the difference between the maximum length and the minimum length of the extruded resin portion 29 regarding all sides to be in the range described above, it is important to adjust the condition of heat fusion in a case of sealing the battery main body 10 in the outer package 20 by the welding of the heat-fusion resin layers 21 of the outer package 20, to be condition which will be described later.

In the lithium ion battery 100 according to the embodiment, the difference (Lmax−Lmin) between the maximum length Lmax and the minimum length Lmin of the extruded resin portion 29 is equal to or greater than 0.0 mm and equal to or smaller than 1.0 mm, preferably equal to or greater than 0.0 mm and equal to or smaller than 0.8 mm, more preferably equal to or greater than 0.0 mm and equal to or smaller than 0.6 mm, even more preferably equal to or greater than 0.0 mm and equal to or smaller than 0.5 mm, still preferably equal to or greater than 0.0 mm and equal to or smaller than 0.4 mm, and particularly preferably equal to or greater than 0.0 mm and equal to or smaller than 0.3 mm. In a case where (Lmax−Lmin) is in the range described above, it is possible to more stably obtain the lithium ion battery 100 having excellent insulating properties.

In addition, the difference (Lmax−Lmin) between the maximum length Lmax and the minimum length Lmin of the extruded resin portion 29, regarding all sides of the lithium ion battery 100 where the electrode terminals 30 are not exposed, is more preferably equal to or greater than 0.0 mm and equal to or smaller than 0.8 mm, even more preferably equal to or greater than 0.0 mm and equal to or smaller than 0.6 mm, still preferably equal to or greater than 0.0 mm and equal to or smaller than 0.5 mm, still more preferably equal to or greater than 0.0 mm and equal to or smaller than 0.4 mm, and particularly preferably equal to or greater than 0.0 mm and equal to or smaller than 0.3 mm.

Further, the difference between the maximum length and the minimum length of the extruded resin portion 29 regarding all sides of the lithium ion battery 100 according to the embodiment is more preferably equal to or greater than 0.0 mm and equal to or smaller than 0.8 mm, even more preferably equal to or greater than 0.0 mm and equal to or smaller than 0.6 mm, still preferably equal to or greater than 0.0 mm and equal to or smaller than 0.5 mm, and still more preferably equal to or greater than 0.0 mm and equal to or smaller than 0.4 mm, and particularly preferably equal to or greater than 0.0 mm and equal to or smaller than 0.3 mm.

Here, the maximum length and the minimum length of the extruded resin portion 29 respectively mean the maximum length and the minimum length among 10 lengths obtained by measuring the lengths L of the extruded resin portion 29 regarding 10 points in total in a region including a center portion of one side of the measurement target.

In the lithium ion battery 100 according to the embodiment, the maximum length Lmax of the extruded resin portion 29 is preferably equal to or smaller than 2.0 mm, more preferably equal to or smaller than 1.8 mm, even more preferably equal to or smaller than 1.5 mm, still preferably equal to or smaller than 1.2 mm, and particularly preferably equal to or smaller than 1.0 mm, from a viewpoint of more stably obtaining the lithium ion battery 100 having more excellent insulating properties.

In addition, in the lithium ion battery 100 according to the embodiment, the maximum length Lmax of the extruded resin portion 29 is preferably equal to or greater than 0.5 mm, more preferably equal to or greater than 0.6 mm, even more preferably equal to or greater than 0.7 mm, and particularly preferably equal to or greater than 0.8 mm, from viewpoints of improving the sealing strength of the outer package 20 by improving the joining properties of the heat-fusion resin layers 21 and increasing the insulating properties.

The maximum length Lmax of the extruded resin portion 29, regarding all sides of the lithium ion battery 100 according to the embodiment where the electrode terminals 30 are not exposed, is preferably equal to or smaller than 2.0 mm, more preferably equal to or smaller than 1.8 mm, even more preferably equal to or smaller than 1.5 mm, still preferably equal to or smaller than 1.2 mm, and particularly preferably equal to or smaller than 1.0 mm, from a viewpoint of more stably obtaining the lithium ion battery 100 having more excellent insulating properties.

In addition, the maximum length Lmax of the extruded resin portion 29, regarding all sides of the lithium ion battery 100 according to the embodiment where the electrode terminals 30 are not exposed, is preferably equal to or greater than 0.5 mm, more preferably equal to or greater than 0.6 mm, even more preferably equal to or greater than 0.7 mm, and particularly preferably equal to or greater than 0.8 mm, from viewpoints of improving the sealing strength of the outer package 20 by improving the joining properties of the heat-fusion resin layers 21 and increasing the insulating properties.

The maximum length of the extruded resin portion 29 regarding all sides of the lithium ion battery 100 according to the embodiment is preferably equal to or smaller than 2.0 mm, more preferably equal to or smaller than 1.8 mm, even more preferably equal to or smaller than 1.5 mm, still preferably equal to or smaller than 1.2 mm, and particularly preferably equal to or smaller than 1.0 mm, from a viewpoint of more stably obtaining the lithium ion battery 100 having more excellent insulating properties.

In addition, the maximum length of the extruded resin portion 29 regarding all sides of the lithium ion battery 100 according to the embodiment is preferably equal to or greater than 0.5 mm, more preferably equal to or greater than 0.6 mm, even more preferably equal to or greater than 0.7 mm, and particularly preferably equal to or greater than 0.8 mm, from viewpoints of improving the sealing strength of the outer package 20 by improving the joining properties of the heat-fusion resin layers 21 and increasing the insulating properties.

Here, the maximum length of the extruded resin portion 29 means the maximum length among 10 lengths obtained by measuring the lengths L of the extruded resin portion 29 regarding 10 points in total in a region including a center portion of one side of the measurement target.

Here, the maximum length Lmax of the extruded resin portion 29 or the maximum length of the extruded resin portion 29 regarding all sides can be adjusted by adjusting the condition of heat fusion in a case of sealing the battery main body 10 in the outer package 20 by the welding of the heat-fusion resin layers 21 of the outer package 20, or adjusting the thickness of the heat-fusion resin layer 21.

In the lithium ion battery 100 according to the embodiment, a standard deviation of the lengths L of the extruded resin portion 29 measured under the following condition is preferably equal to or smaller than 0.20 mm, more preferably equal to or smaller than 0.15 mm, even more preferably equal to or smaller than 0.13 mm, and particularly preferably equal to or smaller than 0.10 mm, from a viewpoint of more stably obtaining the lithium ion battery 100 having more excellent insulating properties.

<Condition>

Lengths L of the extruded resin portion 29 are measured regarding 10 points in total in a region including a center portion of one side of the lithium ion battery 100 on a side where the electrode terminals 30 are not exposed, and a standard deviation of the obtained 10 lengths L of the extruded resin portion 29 is calculated. Here, the length L of the extruded resin portion 29 is a length from the end portion $X_1$ of the joint portion 27 on the accommodation portion 25 side to the end portion $X_2$ of the extruded resin portion 29 on the accommodation portion 25 side and is a length in a vertical direction with respect to the one side.

The standard deviation of the lengths L of the extruded resin portion 29 measured under the above condition, regarding all sides of the lithium ion battery 100 according to the embodiment where the electrode terminals 30 are not exposed, is preferably equal to or smaller than 0.20 mm, more preferably equal to or smaller than 0.15 mm, even more preferably equal to or smaller than 0.13 mm, and particularly preferably equal to or smaller than 0.10 mm, from a viewpoint of more stably obtaining the lithium ion battery 100 having more excellent insulating properties.

The standard deviation of the lengths L of the extruded resin portion 29 measured under the following condition, regarding all sides of the lithium ion battery 100 according to the embodiment is preferably equal to or smaller than 0.20 mm, more preferably equal to or smaller than 0.15 mm, even more preferably equal to or smaller than 0.13 mm, and particularly preferably equal to or smaller than 0.10 mm, from a viewpoint of more stably obtaining the lithium ion battery 100 having more excellent insulating properties.

<Condition>

Lengths L of the extruded resin portion 29 are measured regarding 10 points in total in a region including a center portion of one side of the measurement target, and a standard deviation of the obtained 10 lengths L of the extruded resin portion 29 is calculated. Here, the length L of the extruded resin portion 29 is a length from the end portion $X_1$ of the joint portion 27 on the accommodation portion 25 side to the end portion $X_2$ of the extruded resin portion 29 on the accommodation portion 25 side and is a length in a vertical direction with respect to the one side.

Here, in order to set the standard deviation of the lengths L of the extruded resin portion 29 to be in the range described above, it is important to adjust the condition of heat fusion in a case of sealing the battery main body 10 in the outer package 20 by the welding of the heat-fusion resin layers 21 of the outer package 20, to be condition which will be described later.

In the lithium ion battery 100 according to the embodiment, as shown in FIG. 3, an average value of angles θ between the end portion $X_2$ of the extruded resin portion 29 on the accommodation portion 25 side and a non-fusion portion 22 of the heat-fusion resin layers 21 on the accommodation portion 25 side which is measured under the following condition is preferably equal to or greater than 90°, more preferably equal to or greater than 95°, and even more preferably equal to or greater than 100°. That is, the angle θ is preferably an obtuse angle.

Here, according to the studies of the inventors, it is clear that, in a case where the angle θ is an acute angle (average value of angles θ is smaller than 90°) and an external stress (stress of expansion and contraction of the outer package 20 due to bending of the joint portion 27, a vacuum state of the accommodation portion 25, and charging and discharging of cells, stress with respect to vibration or fall impact, and the like) of the laminated type lithium ion battery 100 is applied, cracks and the like easily occur from the portion of the acute angle, and insulation resistance easily slowly decrease.

Therefore, in a case where the average value of the angles θ is equal to or greater than the lower limit value, durability with respect to the external stress of the lithium ion battery 100 is improved, the electrolytic solution hardly infiltrates between the end portion $X_2$ and the non-fusion portion 22, and it is possible to further prevent a decrease in insulation resistance of the lithium ion battery 100.

<Condition>

Angles θ between the end portion $X_2$ of the extruded resin portion 29 on the accommodation portion 25 side and the non-fusion portion 22 of the heat-fusion resin layers 21 on the accommodation portion 25 side are measured regarding 10 points in total in a region including a center portion of one side of the lithium ion battery 100 on a side where the electrode terminals 30 are not exposed, and an average value of the obtained 10 angles θ is calculated.

Figure 4A:
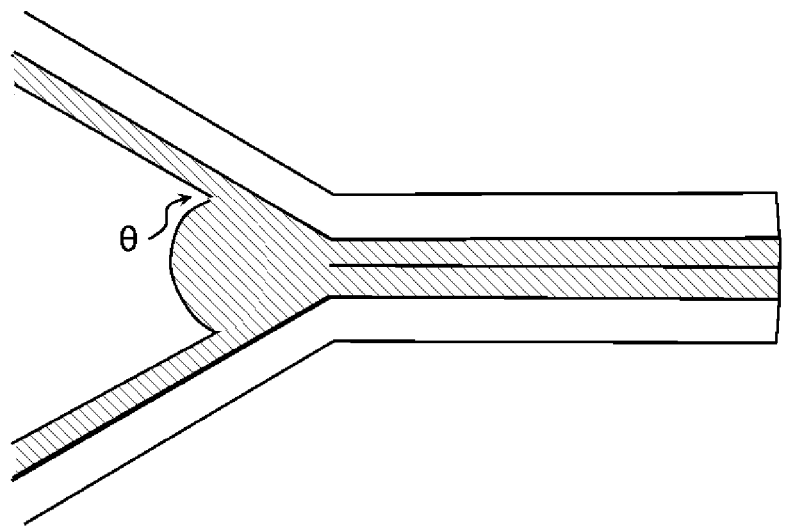
FIGS. 4A and 4B are cross-sectional views schematically showing an example in which an average value of an angle θ is smaller than 90°.
Figure 4B:
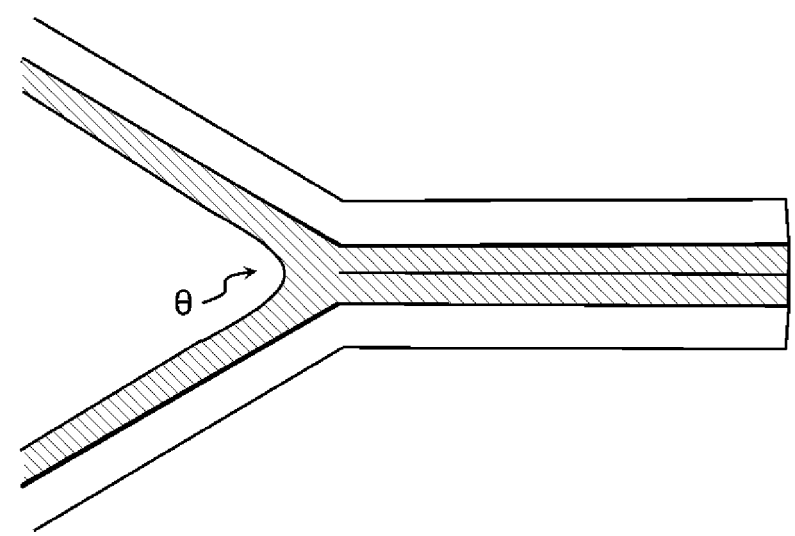

Here, as an example in which the average value of the angles θ between the end portion $X_2$ of the extruded resin portion 29 on the accommodation portion 25 side and the non-fusion portion 22 of the heat-fusion resin layers 21 on the accommodation portion 25 side is smaller than 90°, for example, a state of (A) and (B) shown in FIGS. 4A and 4B are used. In a case where the angle θ is in a state of (A) and (B) shown in FIGS. 4A and 4B, the electrolytic solution easily infiltrates between the end portion $X_2$ and the non-fusion portion 22, and the insulation resistance of the lithium ion battery 100 may easily decrease.

In addition, regarding all sides of the lithium ion battery 100 according to the embodiment where the electrode terminals 30 are not exposed, the average value of the angles θ between the end portion $X_2$ of the extruded resin portion 29 on the accommodation portion 25 side and the non-fusion portion 22 of the heat-fusion resin layers 21 on the accommodation portion 25 side which is measured under the condition described above is preferably equal to or greater than 90°, more preferably equal to or greater than 95°, and even more preferably equal to or greater than 100°. That is, the angle θ is preferably an obtuse angle. In a case where the average value of the angles θ is equal to or greater than the lower limit value, it is possible to further prevent infiltration of the electrolytic solution between the end portion $X_2$ and the non-fusion portion 22 and a decrease in insulation resistance of the lithium ion battery 100.

In addition, regarding all sides of the lithium ion battery 100 according to the embodiment, the average value of the angles θ between the end portion $X_2$ of the extruded resin portion 29 on the accommodation portion 25 side and the non-fusion portion 22 of the heat-fusion resin layers 21 on the accommodation portion 25 side which is measured under the following condition is preferably equal to or greater than 90°, more preferably equal to or greater than 95°, and even more preferably equal to or greater than 100°. That is, the angle θ is preferably an obtuse angle. In a case where the average value of the angles θ is equal to or greater than the lower limit value, it is possible to further prevent infiltration of the electrolytic solution between the end portion $X_2$ and the non-fusion portion 22 and a decrease in insulation resistance of the lithium ion battery 100.

<Condition>

Angles θ between the end portion $X_2$ of the extruded resin portion 29 on the accommodation portion 25 side and the non-fusion portion 22 of the heat-fusion resin layers 21 on the accommodation portion 25 side are measured regarding 10 points in total in a region including a center portion of one side of the measurement target, and an average value of the obtained 10 angles θ is calculated.

Here, in order to set the average value of the angles θ to be in the range described above, it is important to adjust the condition of heat fusion in a case of sealing the battery main body 10 in the outer package 20 by the welding of the heat-fusion resin layers 21 of the outer package 20, to be condition which will be described later.

The average value of the lengths L of the extruded resin portion 29, in a region including a center portion of one side of the lithium ion battery 100 according to the embodiment on a side where the electrode terminals 30 are not exposed, is, for example, preferably equal to or greater than 0.5 mm and equal to or smaller than 1.5 mm, more preferably equal to or greater than 0.7 mm and equal to or smaller than 1.3 mm, and even more preferably equal to or greater than 0.8 mm and equal to or smaller than 1.2 mm.

In addition, the average value of the lengths L of the extruded resin portion 29, regarding all sides of the lithium ion battery 100 according to the embodiment where the electrode terminals 30 are not exposed, is, for example, preferably equal to or greater than 0.5 mm and equal to or smaller than 1.5 mm, more preferably equal to or greater than 0.7 mm and equal to or smaller than 1.3 mm, and even more preferably equal to or greater than 0.8 mm and equal to or smaller than 1.2 mm.

Further, the average value of the lengths L of the extruded resin portion 29 regarding all sides of the lithium ion battery 100 according to the embodiment is, for example, preferably equal to or greater than 0.5 mm and equal to or smaller than 1.5 mm, more preferably equal to or greater than 0.7 mm and equal to or smaller than 1.3 mm, and even more preferably equal to or greater than 0.8 mm and equal to or smaller than 1.2 mm.

Next, an example of each constituent element of the lithium ion battery 100 according to the embodiment will be described.

<Battery Main Body>

The battery main body 10 according to the embodiment includes one or more power generation elements in which the positive electrode layer and the negative electrode layer are laminated on each other through a separator, for example. These power generation elements are accommodated in a container formed of the outer package 20 with an electrolytic solution (not shown). The electrode terminals 30 (positive electrode terminal and negative electrode terminal) are electrically connected to the power generation elements, and a part or the entire portion of each of the electrode terminal 30 is drawn out of the outer package 20.

In the positive electrode layer, a coated portion of a positive electrode active material (positive electrode active material layer) and an uncoated portion are respectively provided on the front and the rear of a positive electrode current collector, and in the negative electrode layer, a coated portion of a negative electrode active material (negative electrode active material layer) and an uncoated portion are respectively provided on the front and the rear of a negative electrode current collector.

The uncoated portion of the positive electrode active material of the positive electrode current collector is set as a positive electrode tab for the connection with the positive electrode terminal, and the uncoated portion of the negative electrode active material of the negative electrode current collector is set as a negative electrode tab for the connection with the negative electrode terminal.

The positive electrode tabs are collected on the positive electrode terminal and connected to each other by ultrasonic welding or the like together with the positive electrode terminal, and the negative electrode tabs are collected on the negative electrode terminal and connected to each other by ultrasonic welding or the like together with the negative electrode terminal. In addition, one end of the positive electrode terminal is drawn out of the outer package and one end of the negative electrode terminal is drawn out of the outer package.

The battery main body 10 according to the embodiment can be manufactured based on a well-known method.

(Positive Electrode Layer)

The positive electrode layer is not particularly limited, and can be suitably selected from positive electrodes capable of being used in a well-known lithium ion battery, according to the usage or the like. The positive electrode layer includes the positive electrode active material layer and the positive electrode current collector.

As the positive electrode active material used in the positive electrode layer, a material having a high electron conductivity which can reversely perform emission·occlusion of lithium ions and easily perform transportation.

Examples of the positive electrode active material used in the positive electrode layer include complex oxides of lithium and transition metal such as lithium nickel composite oxide, lithium cobalt composite oxide, lithium manganese composite oxide, or lithium-manganese-nickel composite oxide, transition metal sulfide such as $TiS_2$, FeS, or MoS$_2$; transition metal oxide such as MnO, V$_2$O$_5$, V$_6$O$_{13}$, or TiO$_2$, and olivine type lithium phosphorus oxide.

The olivine type lithium phosphorus oxide, for example, includes at least one kind of elements from the group consisting of Mn, Cr, Co, Cu, Ni, V, Mo, Ti, Zn, Al, Ga, Mg, B, Nb, and Fe, lithium, phosphorus, and oxygen. A part of these compounds may be partially substituted with other elements for improving properties thereof.

Among these, olivine type lithium iron phosphorus oxide, lithium cobalt composite oxide, lithium nickel composite oxide, lithium manganese composite oxide, or lithium-manganese-nickel composite oxide is preferable. These positive electrode active material has a great capacity and a great energy density, in addition to a high action potential.

The positive electrode active material may be used alone or in combination of two or more kinds thereof.

A binding agent or a conducting agent can be suitably added to the positive electrode active material. As the conducting agent, carbon black, carbon fiber, graphite, or the like can be used. In addition, as the binding agent, polyvinylidene fluoride (PVdF), polytetrafluoroethylene (PTFE), carboxymethyl cellulose, modified acrylonitrile rubber particles, or the like can be used.

The positive electrode layer is not particularly limited, and can be manufactured by a well-known method. For example, a method of dispersing the positive electrode active material, the conducting agent, and the binding agent in an organic solvent to obtain a slurry, and applying and drying this slurry on the positive electrode current collector can be used.

A thickness or a density of the positive electrode layer is suitably determined according to the usage of the battery and thus, is not particularly limited, and can be normally set based on well-known information.

The positive electrode current collector is not particularly limited, and a material generally used in the lithium ion battery can be used, and examples thereof include aluminum, stainless steel, nickel, titanium, and an alloy of these. From viewpoints of cost or availability, electrochemical stability, and the like, aluminum is preferable as the positive electrode current collector.

(Negative Electrode Layer)

The negative electrode layer can be suitably selected from negative electrode capable of being used in a well-known lithium ion battery, according to the usage or the like.

The negative electrode layer includes the negative electrode active material layer and the negative electrode current collector.

The negative electrode active material used in the negative electrode layer can be suitably set according to the usage, as long as it can be used for the negative electrode.

As the specific examples of a material usable as the negative electrode active material, a carbon material such as artificial graphite, natural graphite, amorphous carbon, diamond-like carbon, fullerene, carbon nanotube, or carbon nanohorn; a lithium metal material; an alloy-based material such as silicon or tin; an oxide-based material such as Nb$_2$O$_5$ or TiO$_2$; or composite of these can be used.

The negative electrode active material may be used alone or in combination of two or more kinds thereof.

A binding agent or a conducting agent can be suitably added to the negative electrode active material, in the same manner as the positive electrode active material. As the binding agent or a conducting agent, the same materials added to the positive electrode active material can be used.

As the negative electrode current collector, copper, stainless steel, nickel, titanium, or an alloy of these can be used, and copper is particularly preferable among these.

In addition, the negative electrode layer of the embodiment can be manufactured by a well-known method. For example, a method of dispersing the negative electrode active material and the binding agent in an organic solvent to obtain a slurry, and applying and drying this slurry on the negative electrode current collector can be used.

(Electrolyte Layer)

The electrolyte layer is a layer disposed so as to be interposed between the positive electrode layer and the negative electrode layer. The electrolyte layer which includes the separator and an electrolytic solution and in which a porous separator is impregnated with a non-aqueous electrolytic solution, for example, is used.

The separator is not particularly limited, as long as it has a function of electrically insulating the positive electrode layer and the negative electrode layer from each other and transmitting lithium ions, and for example, a porous separator can be used.

As the porous separator, a porous resin film is used. Examples of the resin configuring the porous resin film include polyolefin, polyimide, polyvinylidene fluoride, and polyester. As the separator, a porous polyolefin film is preferable, a porous polyethylene film and a porous polypropylene film are more preferable.

A polypropylene-based resin configuring the porous polypropylene film is not particularly limited, and examples thereof include a propylene homopolymer and a copolymer of propylene and other olefin, and a propylene homopolymer (homopolypropylene) is preferable. The polypropylene-based resin may be used alone or in combination of two or more kinds thereof.

Examples of olefin copolymerized with propylene include ethylene, α-olefin such as 1-butene, 1-pentene, 4-methyl-1-pentene, 1-hexene, 1-octene, 1-nonene, and 1-decene.

A polyethylene-based resin configuring the porous polyethylene film is not particularly limited, and examples thereof include an ethylene homopolymer and a copolymer of ethylene and other olefin, and an ethylene homopolymer (homopolyethylene) is preferable. The polyethylene-based resin may be used alone or in combination of two or more kinds thereof.

Examples of olefin copolymerized with ethylene include α-olefin such as 1-butene, 1-pentene, 4-methyl-1-pentene, 1-hexene, 1-octene, 1-nonene, and 1-decene.

A thickness of the separator is preferably equal to or greater than 5 μm and equal to or less than 50 μm and more preferably equal to or greater than 10 μm and equal to or less than 40 μm, from a viewpoint of a balance between mechanical strength and lithium ion conductivity.

The separator preferably further includes a ceramic layer on at least one surface of the porous resin film, from a viewpoint of further improving heat resistance.

Since the separator further includes the ceramic layer, it is possible to further reduce thermal shrinkage and further prevent short circuit between electrodes.

The ceramic layer can be formed by applying and drying a ceramic layer forming material on the porous resin layer. As the ceramic layer forming material, for example, a material obtained by dissolving and dispersing an inorganic filler and a binding agent in a suitable solvent can be used, for example.

The inorganic filler used in the ceramic layer can be suitably selected from well-known materials used in the separator of the lithium ion battery. For example, oxide, nitride, sulfide, or carbide having high insulating properties is preferable, and a material obtained by adjusting one kind or two or more kinds of inorganic compounds selected from oxide-based ceramics such as titanium oxide, alumina, silica, magnesia, zirconia, zinc oxide, iron oxide, ceria, and yttria, in a particle shape is more preferable. Among these, titanium oxide or alumina is preferable.

The binding agent is not particularly limited, and examples thereof include cellulose-based resin such as carboxymethyl cellulose (CMC); an acrylic resin; and a fluorine-based resin such as polyvinylidene fluoride (PVDF). The binding agent may be used alone or in combination of two or more kinds thereof.

The solvent for dissolving or dispersing these components is not particularly limited, and for example, water, alcohols such as ethanol, N-methyl pyrrolidone (NMP), toluene, dimethyl carbonate (DMC), or ethyl methyl carbonate (EMC) can be suitably selected and used.

A thickness of the ceramic layer is preferably equal to or greater than 1 μm and equal to or less than 20 μm and more preferably equal to or greater than 1 μm and equal to or less than 12 μm, from a viewpoint of a balance between mechanic strength, handleability, and lithium ion conductivity.

The electrolytic solution according to the embodiment is obtained by dissolving the electrolyte in a solvent.

As the electrolyte, lithium salt is used and may be selected according to the kind of the active material. Examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiC_4F_9SO_3$, $Li(CF_3SO_2)_2N$, and lower fatty acid lithium carboxylate.

The solvent for dissolving the electrolyte is not particularly limited, as long as it is a solvent generally used as liquid for dissolving the electrolyte, and examples thereof include carbonates such as ethylene carbonate (EC), propylene carbonate (PC), butylene carbonate (BC), dimethyl carbonate (DMC), diethyl carbonate (DEC), methylethyl carbonate (MEC), and vinylene carbonate (VC); lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethylsulfoxide; oxolans such as 1,3-dioxolane and 4-methyl-1,3-dioxolane; a nitrogen-containing solvent such as acetonitrile, nitromethane, formamide, or dimethylformamide; organic acid esters such as methyl formate, methyl acetate, ethyl acetate, butyl acetate, methyl propionate, ethyl propionate; phosphate triesters and diglymes; triglymes; sulfolanes such as sulfolane and methylsulfolane; oxazolidinones such as 3-methyl-2-oxazolidinone; and sultones such as 1,3-propane sultone, 1,4-butane sultone, and naphthasultone. These may be used alone or in combination of two or more kinds thereof.

<Outer Package>

The outer package 20 according to the embodiment substantially has a planar shape of a square, for example. The outer package 20 according to the embodiment includes the accommodation portion 25 which accommodates the battery main body 10, the joint portion 27 where the heat-fusion resin layers 21 positioned on a peripheral portion of the accommodation portion 25 are joined with each other directly or through the electrode terminal 30, and the extruded resin portion 29 which is formed by extrusion of a part of the heat-fusion resin layer 21 of the joint portion 27 from the joint portion 27 to the accommodation portion 25 side.

The outer package 20 according to the embodiment is not particularly limited, as long as it includes at least the heat-fusion resin layer 21 and the barrier layer 23 and seals the battery main body 10 therein.

From a viewpoint of weight reduction of the battery, it is preferable to use a laminate film including at least the heat-fusion resin layer 21 and the barrier layer 23. As the barrier layer 23, a layer having barrier properties of preventing leakage of the electrolytic solution or permeation of moisture from the outside can be selected, and for example, a barrier layer configured with metal such as stainless steel (SUS) foil, aluminum foil, aluminum alloy foil, copper foil, or titanium foil can be used. A thickness of the barrier layer 23 is, for example, equal to or greater than 10 μm and equal to or smaller than 100 μm, preferably equal to or greater than 20 μm and equal to or smaller than 80 μm, and more preferably equal to or greater than 30 μm and equal to or smaller than 50 μm.

The resin material configuring the heat-fusion resin layer 21 is not particularly limited, and for example, polyethylene, polypropylene, nylon, or polyethylene terephthalate (PET) can be used. A thickness of the heat-fusion resin layer 21 is, for example, equal to or greater than 20 μm and equal to or smaller than 200 μm, preferably equal to or greater than 30 μm and equal to or smaller than 150 μm, and more preferably equal to or greater than 50 μm and equal to or smaller than 100 μm.

The number of heat-fusion resin layer 21 or the barrier layer 23 of the laminate film according to the embodiment is not limited to 1 and may be 2 or more.

In the embodiment, the outer package 20 can be formed by causing the heat-fusion resin layers 21 to face each other through the battery main body 10 and performing heat fusion of the periphery of the portion accommodating the battery main body 10. A resin layer such as a nylon film or a polyester film can be provided on an outer surface of the outer package 20 which is a surface opposite to the surface where the heat-fusion resin layer 21 is formed.

Next, a method of the heat fusion of the heat-fusion resin layer 21 will be described. In order to obtain the lithium ion battery 100 according to the embodiment, it is important to carry out a method of causing the heat-fusion resin layers 21 to face each other through the battery main body 10 and performing heat fusion of the periphery of the portion accommodating the battery main body 10 under the suitable condition.

According to the studies of the inventors, it is found that, in a case where the heat-fusion resin layers are subjected to heat fusion (also referred to as heat sealing), in a state where a differential pressure is generated between the inner side and the outer side of the outer package, a variation easily occurs in length of the extruded resin portion formed by the extrusion of the heat-fusion resin layer in a horizontal direction.

The reason thereof is not clear, but the following reason is considered. First, in the heat sealing of the outer package after injecting the electrolytic solution into the battery, it is necessary to perform heat sealing by removing air in the outer package (that is, accommodation portion). After removing the air in the accommodation portion after performing temporary sealing with a vacuum sealing machine, the heat sealing (hereinafter, also referred to as regular sealing) is performed again using a typical sealing machine under the atmospheric pressure.

In this case, since the pressure in the outer package is reduced, the space of the accommodation portion is decreased and a distance between the non-fusion portions of the heat-fusion resin layer is narrowed. Due to the decreased space of the accommodation portion or the narrowed distance between the non-fusion portions of the heat-fusion resin layer, the shape of the outer package on the accommodation portion side is greatly deformed. The resin extruded from the heat-fusion resin layer at the time of the regular sealing flows to a portion where the shape of the outer package is deformed, and a length of the extruded resin portion on the deformed portion may increase or decrease. Due to the reason described above, it is considered that, in a state where a differential pressure is generated between the inner side and the outer side of the outer package, in a case where the heat-fusion resin layers are subjected to heat fusion, a variation easily occurs in length of the extruded resin portion.

One side to be sealed after the injection of the electrolytic solution is one side on a side where the electrode terminals are not exposed.

The inventors have conducted intensive studies based on the above finding, and found that, by performing the regular sealing under the condition where the differential pressure is not generated between the inner side and the outer side of the outer package, it is possible to perform the welding so that the shape of the outer package is not changed, and as a result, it is possible to prevent a variation in length of the extruded resin portion.

That is, in order to obtain the lithium ion battery 100 according to the embodiment, it is important to perform the heat fusion of the heat-fusion resin layers 21 under the condition where the differential pressure is not generated between the inner side and the outer side of the outer package.

In addition, according to the studies of the inventors, the inventors have found that, in a case where the heat-fusion resin layers are subjected to heat fusion under the condition at a high temperature for a short time, an angle θ between the end portion of the extruded resin portion on the accommodation portion side and the non-fusion portion of the heat-fusion resin layer on the accommodation portion side becomes an acute angle.

The reason thereof is not clear, but the following reason is considered. First, in a case where the heat-fusion resin layers are subjected to heat fusion, the heat-fusion resin layer on the joint portion immediately under a heater portion is melted and extruded in a horizontal direction at a comparatively high temperature. In this case, the temperature of the heat-fusion resin layer in the vicinity of the accommodation portion other than the portion immediately under the heater portion is a comparatively low temperature, a greater temperature difference is generated between the extruded heat-fusion resin layer at a high temperature and the contacted heat-fusion resin layer at a low temperature. As a result, it is considered that the angle θ between the end portion of the extruded resin portion on the accommodation portion side and the non-fusion portion of the heat-fusion resin layer on the accommodation portion side becomes an acute angle.

The inventors have conducted intensive studies based on the above finding, and found that, by performing the heat fusion under the condition at a comparatively low temperature and for a long period of time, it is possible to decrease a difference between a temperature of the extruded resin portion and a temperature of the non-fusion portion, and as a result, it is possible to set the angle θ between the end portion $X_2$ of the extruded resin portion 29 on the accommodation portion 25 side and the non-fusion portion 22 of the heat-fusion resin layers 21 on the accommodation portion 25 side to be an obtuse angle.

That is, in the lithium ion battery 100 according to the embodiment, in order to set the angle θ between the end portion $X_2$ of the extruded resin portion 29 on the accommodation portion 25 side and the non-fusion portion 22 of the heat-fusion resin layers 21 on the accommodation portion 25 side to be an obtuse angle, it is important to perform the heat fusion of the heat-fusion resin layers 21 at a low temperature for a long period of time.

A heating temperature in a case of performing the heat fusion of the heat-fusion resin layers 21 varies depending on a melting point of a resin material configuring the heat-fusion resin layer 21, but in a case where the resin material configuring the heat-fusion resin layer 21 is polypropylene, for example, the heating temperature is preferably 140° C. to 185° C. and more preferably 150° C. to 180° C.

In addition, a heat sealing time in a case of performing the heat fusion of the heat-fusion resin layers 21 is, for example, 10 seconds to 50 seconds and preferably 12 seconds to 30 seconds.

(Electrode Terminal)

In the embodiment, a well-known member can be used for a pair of electrode terminals 30 (positive electrode terminal and the negative electrode terminal). For example, a material configured with aluminum or an aluminum alloy can be used for the positive electrode terminal, and for example, copper, a copper alloy, or a material obtained by performing nickel plating thereto can be used for the negative electrode terminal. Each terminal is drawn out of the container, and the heat-fusion resin layer 21 is provided on a portion of each terminal positioned on a portion for heat fusion of the periphery of the outer package 20, in advance.

In FIG. 1, the positive electrode terminal and the negative electrode terminal are drawn from different sides of the outer package 20, but the positive electrode terminal and the negative electrode terminal may be drawn from the same side of the outer package 20.

Hereinabove, the embodiment of the invention has been described, but these are merely example of the invention and various other configurations can be used.

The invention is not limited to the embodiment described above, and modifications, improvements, and the like capable of achieving the object of the invention are included in the invention.

Example 1

<Manufacturing of Positive Electrode Layer>

A composite oxide including $LiMn_2O_4$ and $LiNi_{0.8}Co_{0.1}Al_{0.1}O_2$ as main components was used as the positive electrode active material, carbon black was used as the conducting agent, and polyvinylidene fluoride (PVdF) was used as the binding agent. These were dispersed in the organic solvent to prepare a slurry. This slurry was continuously applied and dried on an aluminum foil having a thickness of 20 μm which is the positive electrode current collector, and a positive electrode roll including a coated portion of the positive electrode current collector and an uncoated portion where the coating was not performed, was manufactured.

This positive electrode roll was set as a positive electrode by causing the uncoated portion to be a tab for connection to the positive electrode terminal to remain, and performing punching so that a dimension except the positive electrode tab was vertically 224 mm and horizontally 96 mm.

<Manufacturing of Negative Electrode Layer>

Artificial graphite was used as the negative electrode active material, and polyvinylidene fluoride (PVdF) was used as the binding agent. These were dispersed in an organic solvent to prepare a slurry. This slurry was continuously applied and dried on a copper foil having a thickness of 10 μm which is the negative electrode current collector, and a negative electrode roll including a coated portion of the negative electrode current collector and an uncoated portion where the coating was not performed, was manufactured.

This negative electrode roll was set as a negative electrode by causing the uncoated portion to be a tab for connection to the negative electrode terminal to remain, and performing punching so that a dimension except the negative electrode tab was vertically 230 mm and horizontally 100 mm.

<Separator>

As the separator, a porous polypropylene film having a thickness of 25 μm was used.

<Manufacturing of Lithium Ion Battery>

The positive electrode layer and the negative electrode layer were laminated on each other through the separator, the negative electrode terminal or the positive electrode terminal was provided thereon, and the battery main body was obtained. Then, an electrolytic solution obtained by dissolving 1 M of $LiPF_6$ into a solvent formed of ethylene carbonate and diethyl carbonate, and the obtained battery main body was accommodated in an outer package formed of a laminate film (laminate film including a heat-fusion resin layer (polypropylene resin layer, melting point: 140° C., thickness: 80 μm) and a barrier layer (aluminum foil, thickness: 40 μm)), and the peripheral portion of the outer package was subjected to heat fusion, and accordingly, a laminated type lithium ion battery shown in FIG. 1 was obtained. The battery capacity of this lithium ion battery was 30 Ah, the positive electrode was 30 layers and the negative electrode was 31 layers.

Here, the heat fusion of one side (one side where the electrode terminals are not exposed) of the outer package to be sealed after injecting the electrolytic solution was performed under the condition at 175° C. for 13 seconds under the reduced pressure.

<Evaluation>

(1) Measurement of Length of Extruded Resin Portion

The joint portion where the heat-fusion resin layers are directly joined with each other was partially cut in a cross sectional shape and the cross section thereof was polished. Then, the length of the extruded resin portion was measured using a microscope.

Here, lengths of the extruded resin portion were measured regarding 10 points in total at interval of 20 mm in 200 mm in a region including a center portion of one side (one side to be sealed after the injection of the electrolytic solution) of the lithium ion battery on a side where the electrode terminals are not exposed, the maximum length Lmax of the extruded resin portion, the minimum length Lmin of the extruded resin portion, the average value of the lengths L of the extruded resin portion, and the standard deviation of the lengths L of the extruded resin portion were respective obtained using the obtained 10 lengths of the extruded resin portion.

The obtained evaluation result is shown in Table 1.

(2) Measurement of Angle θ

The joint portion where the heat-fusion resin layers are directly joined with each other was partially cut in a cross sectional shape and the cross section thereof was polished. Then, the shape of the extruded resin portion was observed using a microscope, and the angle θ between the end portion $X_2$ of the extruded resin portion on the accommodation portion side and the non-fusion portion of the heat-fusion resin layer on the accommodation portion side was obtained.

Here, angles θ were measured regarding 10 points in total at interval of 20 mm in 200 mm in a region including a center portion of one side (one side to be sealed after the injection of the electrolytic solution) of the lithium ion battery on a side where the electrode terminals are not exposed, and an average value of the obtained 10 angles θ is calculated.

The obtained evaluation result is shown in Table 1.

(3) Insulating Properties

The insulation resistance of the laminated type lithium ion battery was measured using an insulation resistance tester. Here, the negative electrode terminal of the laminated type lithium ion battery was connected to a negative terminal of the insulation resistance tester, the aluminum foil portion of the laminate film was connected to a positive electrode of the insulation resistance tester, and the insulation resistance was measured under the condition of an external applying voltage of 100 V.

Then, the insulating properties of the lithium ion battery were evaluated based on the following criteria.

A: insulation resistance of the lithium ion battery is equal to or greater than 1,000 MΩ

B: insulation resistance of the lithium ion battery is equal to or greater than 10 MΩ and smaller than 1,000 MΩ

C: insulation resistance of the lithium ion battery is smaller than 10 MΩ

The obtained evaluation result is shown in Table 1.

Example 2

A lithium ion battery was manufactured in the same manner as in Example 1, except that the heat fusion of one side (one side where the electrode terminals are not exposed) of the outer package to be sealed after injecting the electrolytic solution was performed under the condition at 175° C. for 15 seconds under the reduced pressure, and the same evaluation as in Example 1 was performed.

The obtained evaluation result is shown in Table 1.

Example 3

A lithium ion battery was manufactured in the same manner as in Example 1, except that the heat fusion of one side (one side where the electrode terminals are not exposed) of the outer package to be sealed after injecting the electrolytic solution was performed under the condition at 180° C. for 10 seconds under the atmospheric pressure, and the same evaluation as in Example 1 was performed.

The obtained evaluation result is shown in Table 1.

Example 4

A lithium ion battery was manufactured in the same manner as in Example 1, except that the heat fusion of one side (one side where the electrode terminals are not exposed) of the outer package to be sealed after injecting the electrolytic solution was performed under the condition at 180° C. for 13 seconds under the atmospheric pressure, and the same evaluation as in Example 1 was performed.

The obtained evaluation result is shown in Table 1.

Comparative Example 1

A lithium ion battery was manufactured in the same manner as in Example 1, except that the heat fusion of one side (one side where the electrode terminals are not exposed) of the outer package to be sealed after injecting the electrolytic solution was performed as the temporary sealing under the condition at 180° C. for 3 seconds under the reduced pressure and then, as the final sealing under the condition at 175° C. for 13 seconds under the atmospheric pressure, and the same evaluation as in Example 1 was performed.

The obtained evaluation result is shown in Table 1.

In the temporary sealing, the heat-fusion resin layer is not substantially dissolved, and accordingly, the extruded resin portion was not formed, and the joining was not sufficient by only the temporary sealing. Therefore, the final sealing was performed.

Comparative Example 2

A lithium ion battery was manufactured in the same manner as in Example 1, except that the heat fusion of one side (one side where the electrode terminals are not exposed) of the outer package to be sealed after injecting the electrolytic solution was performed as the temporary sealing under the condition at 180° C. for 3 seconds under the reduced pressure and then, as the final sealing under the condition at 210° C. for 3 seconds under the atmospheric pressure, and the same evaluation as in Example 1 was performed.

The obtained evaluation result is shown in Table 1.

TABLE 1

| | Example 1 | Example 2 | Example 3 | Example 4 | Comparative Example 1 | Comparative Example 2 |
|---|---|---|---|---|---|---|
| $L_{max}$ [mm] | 1.0 | 1.2 | 1.3 | 1.5 | 2.3 | 2.7 |
| $L_{min}$ [mm] | 0.8 | 0.9 | 0.9 | 1.0 | 1.0 | 1.1 |
| ($L_{max} - L_{min}$) [mm] | 0.2 | 0.3 | 0.4 | 0.5 | 1.3 | 1.6 |
| Average value of L [mm] | 0.9 | 1.0 | 1.1 | 1.2 | 1.6 | 1.7 |
| Standard deviation of L [mm] | 0.06 | 0.08 | 0.13 | 0.14 | 0.40 | 0.43 |
| Average value of angle θ | 110 | 120 | 100 | 100 | 90 | 30 |
| Insulating properties | A | A | A | A | B | C |

From Table 1, in the lithium ion batteries of the examples in which the difference (Lmax−Lmin) between the maximum length Lmax and the minimum length Lmin of the extruded resin portion is equal to or greater than 0.0 mm and equal to or smaller than 1.0 mm, the insulation resistance was high and the insulating properties were excellent. On the other hand, in the lithium ion batteries of the comparative examples in which the difference (Lmax−Lmin) between the maximum length Lmax and the minimum length Lmin of the extruded resin portion is not equal to or greater than 0.0 mm and equal to or smaller than 1.0 mm, the insulation resistance was low and the insulating properties were deteriorated.

The invention claimed is:

1. A lithium ion battery, comprising:
a battery main body which includes one or more power generation elements configured by laminating a positive electrode layer, an electrolyte layer, and a negative electrode layer, in this order;
an outer package which includes at least a heat-fusion resin layer and a barrier layer, and in which the battery main body is sealed; and
a pair of electrode terminals, each of which is electrically connected to the battery main body and at least a part of which is exposed to the outside of the outer package,
wherein the outer package includes an accommodation portion which accommodates the battery main body, a joint portion where the heat-fusion resin layers positioned on a peripheral portion of the accommodation portion are joined with each other directly or through the electrode terminal, and an extruded resin portion which is formed by extrusion of a part of the heat-fusion resin layer of the joint portion from the joint portion to the accommodation portion side,
a difference (Lmax−Lmin) between a maximum length Lmax and a minimum length Lmin of the extruded resin portion measured under the following condition is equal to or greater than 0.0 mm and equal to or smaller than 1.0 mm,
lengths L of the extruded resin portion are measured regarding 10 points in total in a region including a center portion of one side of the lithium ion battery on a side where the electrode terminals are not exposed, and the maximum length is set as the maximum length Lmax and the minimum length is set as the minimum length Lmin, from the obtained 10 lengths, and
the length L of the extruded resin portion is a length from an end portion of the joint portion on the accommodation portion side to an end portion of the extruded resin portion on the accommodation portion side and is a length in a vertical direction with respect to the one side.

2. The lithium ion battery according to claim 1,
wherein a standard deviation of the lengths L of the extruded resin portion measured under the following condition is equal to or smaller than 0.20 mm,
lengths L of the extruded resin portion are measured regarding 10 points in total in a region including a center portion of one side of the lithium ion battery on a side where the electrode terminals are not exposed, and a standard deviation of the obtained 10 lengths L of the extruded resin portion is calculated, and
the length L of the extruded resin portion is a length from an end portion of the joint portion on the accommodation portion side to an end portion of the extruded resin portion on the accommodation portion side and is a length in a vertical direction with respect to the one side.

3. The lithium ion battery according to claim 1,
wherein the maximum length Lmax of the extruded resin portion is equal to or greater than 0.5 mm and equal to or smaller than 2.0 mm.

4. The lithium ion battery according to claim 1,
wherein an average value of angles between the end portion of the extruded resin portion on the accommodation portion side and a non-fusion portion of the heat-fusion resin layers on the accommodation portion side which is measured under the following condition is equal to or greater than 90°, and angles between the end portion of the extruded resin portion on the accommodation portion side and the non-fusion portion of the heat-fusion resin layers on the accommodation portion side are measured regarding 10 points in total in a region including a center portion of one side of the lithium ion battery on a side where the electrode terminals are not exposed, and an average value of the obtained 10 angles is calculated.

5. The lithium ion battery according to claim 1,
wherein the outer package is a laminate film including at least the heat-fusion resin layer and the barrier layer.

6. The lithium ion battery according to claim 1,
wherein the heat-fusion resin layer is formed by performing a heat fusion under a condition at a heating temperature which is 140° C. to 185° C., and for a heat sealing time which is 10 seconds to 50 seconds.

* * * * *